Dec. 27, 1949      P. F. SHIVERS      2,492,244
LEVELING SUPPORT Filed Sept. 24, 1942      5 Sheets-Sheet 1

INVENTOR.
PAUL F. SHIVERS
BY
George H. Fisher
ATTORNEY

Dec. 27, 1949     P. F. SHIVERS     2,492,244
LEVELING SUPPORT Filed Sept. 24, 1942     5 Sheets-Sheet 3

INVENTOR.
PAUL F. SHIVERS
BY
George H. Fisher
ATTORNEY

Patented Dec. 27, 1949

2,492,244

UNITED STATES PATENT OFFICE 2,492,244

LEVELING SUPPORT

Paul F. Shivers, Edina, Minn., assignor to Minneapolis-Honeywell Regulator Company, Minneapolis, Minn., a corporation of Delaware Application September 24, 1942, Serial No. 459,517

7 Claims. (Cl. 318—19)

The present invention is directed to levelling supports and particularly to an automatically operated aerial camera levelling device.

An object of the invention is to provide an improved levelling device including a gimbal supporting a track on which the device being maintained level may be rotated about a vertical axis.

Another object of the invention is to provide an improved levelling device which includes a support rotatable on a track which is maintained automatically in level position.

An object of the invention is to provide an improved levelling device especially adapted for use with aerial cameras which will automatically maintain the camera in level position even though the airplane in which the camera is mounted is subject to various inclinations due to uneven air conditions.

Another object of the invention is to provide an improved automatically controlled levelling device including a gimbal support in which the control motors carried by the gimbal are so disposed as to substantially counterbalance one another.

A further object of the invention is to provide an improved gravity responsive pick-up unit for controlling an electric motor to correct for any inclination of the device being maintained in level position.

A further object of the invention is to provide an improved gravity influenced control device in which a pendulum controls the impedance of an electric circuit.

A still further object of the invention is to provide a gravity influenced control means which is substantially unaffected by accelerations thereof.

Other objects will be apparent from the following detailed description, from the claims, and from the drawings, in which:

Referring now to the drawings, a levelling device which may be used, for example, to support an aerial camera, is shown in Figures 1, 2, 3 and 4. A generally circular frame 10 has four mounting lugs 11 integral therewith, the lugs 11 being adapted to mount the frame 10 in a normally horizontal position on the interior of an airplane. It is intended that the frame 10 be disposed above an opening in the bottom of the airplane fuselage. Suitable means are of course provided for carrying the frame 10 within the airplane. A gimbal ring 14 is pivoted in the frame 10 on trunnions 15 and 16, so that the gimbal ring 14 pivots on a normally horizontal axis. The gimbal ring 14 carries an annular frame member 18 upon a pair of trunnions 19 and 20, which are disposed so that the member 18 is pivoted on a normally horizontal axis at right angles to the axis through the trunnions 15 and 16. The two sets of trunnions 15, 16, and 19, 20 provide a support which permits the member 18 to be maintained in a level position regardless of any inclination of the frame 10, within reasonable limits.

A plurality of rollers 23 (see Figs. 2 and 3) are mounted on stub shafts carried by the annular frame member 18 and projecting inwardly therefrom. The rollers 23 are disposed in a single plane and are provided with a V-shaped periphery so as to engage a correspondingly V-shaped groove 25 in the under side of a flange which is integral with another annular frame member 26. The annular frame member 26 is supported by the rollers 23 in the member 18, so as to be rotatable about an axis normally vertical with respect to the member 18. A pair of camera supports 30 are secured to the member 26 by means of studs 31. Sponge rubber pads 33, and sponge rubber washers 34 are used to space the supports 30 from the frame member 26 and the studs 31 respectively, so that vibration occurring in the member 26 will not be transmitted to the camera supports 30. Each of the camera supports 30 carries a pillow block 29, on which is pivotally mounted a clamping lever 36. Each of the levers 36 is apertured to receive a threaded bolt provided with a thumb screw 37 above the lever 36. The construction is such that a projection on the camera or other supported device may be firmly clamped between the lever 36 and the pillow block 29. Each of the blocks 29 has a pin 38 extending into the circular opening therethrough which aids in preventing rotation of the camera with respect to the camera support 30. A camera 39 is represented by dotted lines in Figures 1 and 4.

One of the camera supports 30 carries a controlling pick-up 40 which will be described in detail in connection with Figures 6 and 7. The pick-up 40 is of the gravity influenced type and since it is mounted on one of the camera supports it is sensitive to any deviations of the camera from level position.

In order to compensate for lateral drift of the airplane and to position the camera about a vertical axis so that it will be in line with the true direction of flight of the airplane, a motor 44, hereinafter referred to as the azimuth motor, is provided to rotate the frame member 26 on the rollers 23. The motor 44 is carried by the frame member 26, and drives a pinion 45 through a reduction gear 46. The pinion 45 engages a rack 48 on the lower periphery of the member 18. The motor 44 is of the reversible type and may be controlled by the pilot of the airplane. The control circuit for the motor 44 will be described in connection with Figure 5. A follow-up mechanism 49 is mounted integrally with the motor 44 and this follow-up mechanism will also be described in connection with Figure 5.

The member 18 is provided with a downwardly extending portion 51 (see Figs 3 and 4) carrying a reversible electric motor 52, hereinafter referred to as the roll motor, which drives a pinion 54 through a reduction gear 55. The pinion 54 engages a gear segment 57 which is integral with the gimbal ring 14 and extends downwardly therefrom. Operation of the motor 52 and rotation of the pinion 54 causes relative rotation of the member 18 and the gimbal ring 14 on the trunnions 19 and 20. It will be noted that the motor 52 and the "azimuth" motor 44 are normally diametrically opposed to each other with respect to the vertical axis of the mechanism. The motors therefore counterbalance each other, and an eccentric load which might tend to rotate gimbal 14 in the trunnions 15 and 16 is thereby avoided. The motor 52 is controlled by the pick-up 40, the electrical connections therebetween being diagrammatically illustrated in Figure 6.

A reversible electric motor 60 (Figs 1, 3 and 4), hereinafter referred to as the pitch motor, is carried by the frame 10. The motor 60 operates a pinion 61 through a reduction gear 62 and the pinion 61 cooperates with a gear segment 64 which is formed integrally with the gimbal ring 14. The motor 60 therefore serves to angularly position the gimbal ring 14 in the frame 10 about the axis 15—16. The pitch motor 60, like the roll motor 52 is controlled by the pick-up 40.

Since the gimbal ring 14 is pivoted in the frame 10 on the axis 15—16 and the member 18 is pivoted in the gimbal ring 14 on the axis 19—20 which is at right angles to the axis 15—16, it will be seen that the motors 52 and 60 may be positioned to compensate for any inclination of the frame 10 within reasonable limits.

All electrical connections have been omitted from Figures 1 through 4 since it was felt that the disclosure would be confused rather than clarified by showing such electrical connections. They are shown diagrammatically in Figures 5 and 6.

Figure 1:
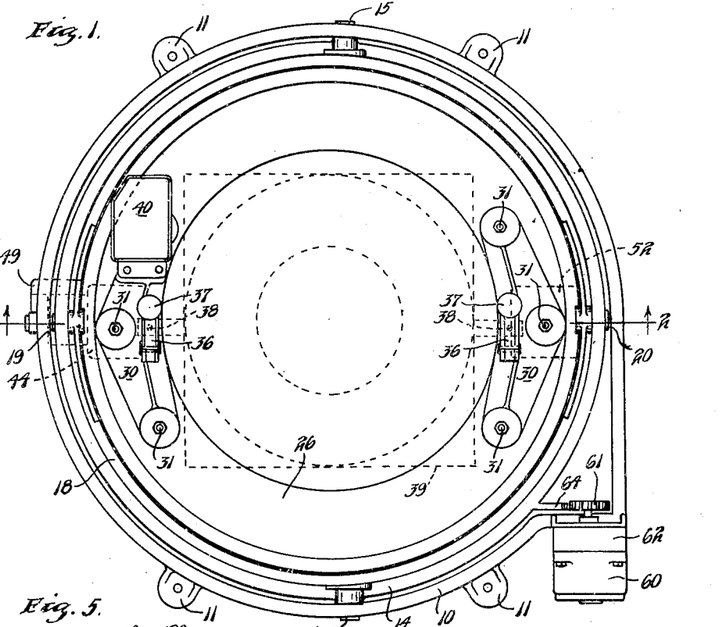
Figure 1 is a plan view of an aerial camera levelling device incorporating certain features of my invention.
Figure 2:
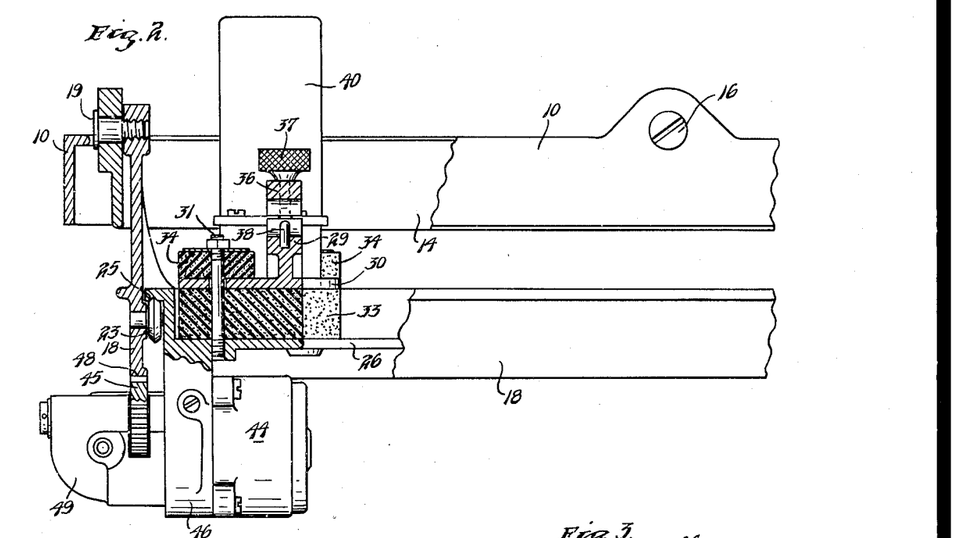
Figure 2 is an elevation, partly in section, of the device shown in Figure 1, the section being taken substantially on line 2—2 of Figure 1.
Figure 3:
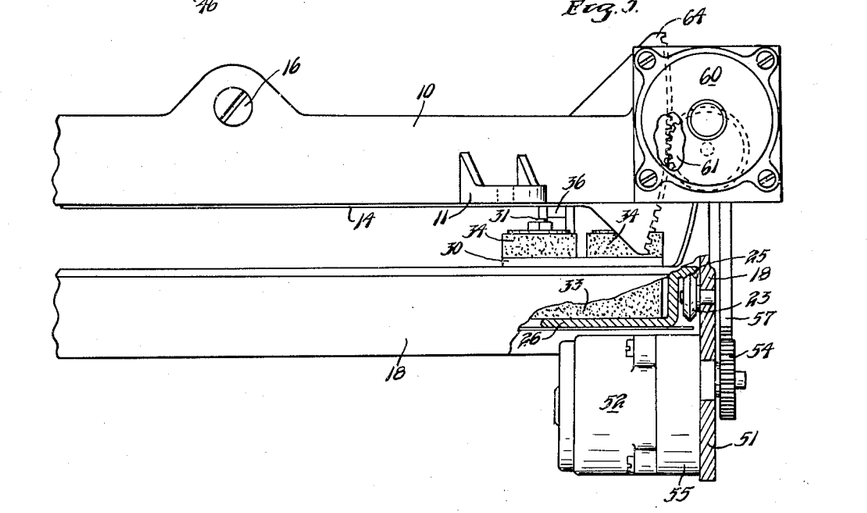
Figure 3 is a continuation of the view shown in Figure 2.
Figure 4:
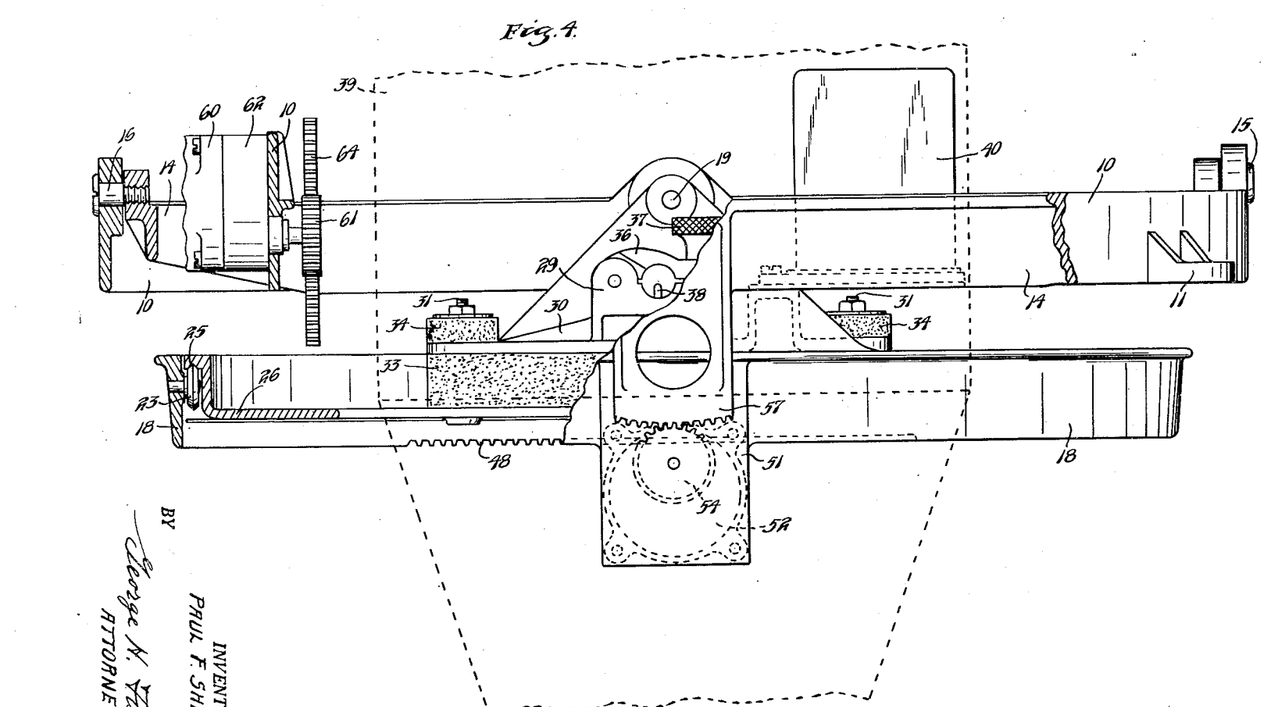
Figure 4 is an elevation of the device shown in Figure 1, with certain portions of the left-hand side broken away.
Figure 5:
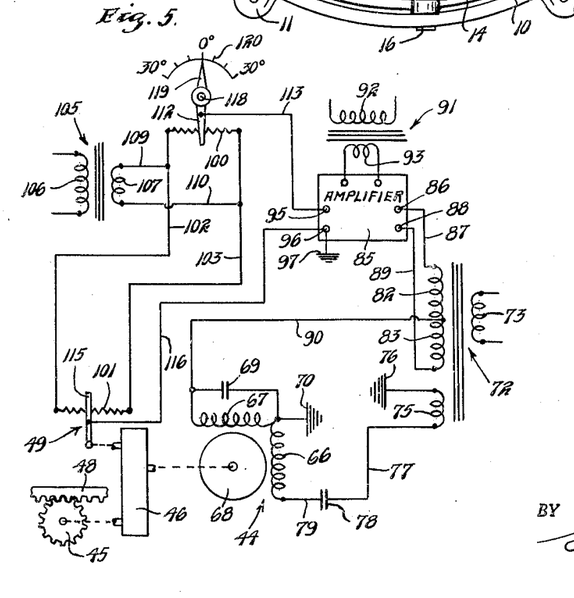
Figure 5 is a schematic wiring diagram of an electric control circuit for one of the motors used in my invention.

Referring now to the wiring diagram of Figure 5 directed to the "azimuth" control, it will be seen that the motor 44 which is of the split-phase induction type includes a pair of windings 66 and 67, which are spaced ninety electrical degrees apart, in accordance with the conventional construction of such motors. The motor 44 also includes an armature 68 which operates the pinion 45 through a reduction gear box 46. A condenser 69 is connected in parallel with the winding 67. The common terminal of the windings 66 and 67 is grounded at 70.

The capacitance of the condenser 69 and the inductance of winding 67 are so proportioned that the two form a series resonant loop circuit. This loop circuit is supplied with energy by transformer action from the winding 66, but the current flow in winding 67 caused by this transformer action is not sufficient, or of the proper phase relationship, to cause rotation of motor armature 68. When a slight additional amount of energy is supplied to winding 67, however, it is energized sufficiently to start rotation of the armature 68 in a direction determined by the phase of such additional amount of energy.

Power is supplied to the motor 44 from a transformer 72 having a primary winding 73 which is connected to a suitable source of alternating current. The transformer 72 has a secondary winding 75, one terminal of which is grounded at 76 and the other terminal of which is connected to the motor winding 66 through wire 77, a condenser 78, and wire 79. The winding 66 is therefore constantly energized through the condenser 78.

The transformer 72 also includes a pair of secondary windings 82 and 83 which in conjunction with an amplifier generally illustrated at 85 supply power to the winding 67 of the motor 44. The upper end of the secondary winding 82 is connected to an output terminal 86 through a wire 87, while the lower end of the secondary winding 83 is connected to the output terminal 88 of the amplifier 85 through a wire 89. The mid-point of secondary windings 82—83 is connected to motor winding 67 through a wire 90. The amplifier 85 may preferably be of the type disclosed in Figure 1 of the co-pending application of Albert P. Upton, Serial No. 437,561, dated April 3, 1942, now matured into Patent No. 2,423,534, issued July 8, 1947. Power is supplied for operation of the amplifier 85 from a transformer 91 having a primary winding 92 connected to a suitable source of alternating current and a secondary winding 93 which is connected to the amplifier. The amplifier 85 also includes input terminals 95 and 96, the input terminal 96 being grounded at 97. The overall effect of amplifier 85 is to supply the motor winding 67 with alternating current of a given phase or the opposite phase, depending upon the phase relation between an alternating signal impressed on the input terminals 95 and 96 and that of the alternating current existing in the secondary windings 82 and 83 of the transformer 72. It may be considered that current supplied to the winding 67 of the motor 44 will be either in phase with the current flowing in the secondary winding 75 of the transformer 72 or 180 degrees out of phase with that current. Since the motor 66 is supplied with current from the transformer 72 through the condenser 78, the current flowing in that winding is substantially ninety degrees out of phase with the current flowing in the primary winding 73 of the transformer 72. Hence, the armature 68 of the motor 44 rotates in opposite directions, depending upon the phase of the alternating signal impressed on input terminals 95 and 96.

The phase of the alternating signal supplied to the amplifier 85 is determined by a bridge circuit which includes an electrical resistance 100 and a second electrical resistance 101 connected in parallel. The two ends of these resistances are interconnected by wires 102 and 103. A transformer 105 having a primary winding 106 and a secondary winding 107 serves as a source of electrical potential for the bridge circuit, the upper end of the secondary winding 107 being connected to the wire 102 by a wire 109 and the lower end of the secondary winding being connected to the winding 103 by a wire 110. Although the transformers 72 and 105 have been shown separate, in actual practice the secondary 107 of the transformer 105 would be an additional secondary winding on the transformer 72. If the transformers are separate as shown, the primary 73 of the transformer 72 and the primary 106 of the transformer 105 should be energized from the same source of alternating current, so that the phase of the electrical potentials in the various secondary windings would bear a definite relation to one another. A slider 112 cooperating with the resistance 100 is connected to the input terminal 95 of the amplifier 85 by a wire 113. A slider 115 cooperating with the resistance 101 is connected to the input terminal 96 of the amplifier 85 by a wire 116. The slider 115 together with the resistance 101 constitute the follow-up mechanism 49 illustrated in Figures 1 and 2, the slider 115 being positioned by the armature 68 of the motor 44 through a reduction gear. The arrangement is such that the slider 115 has a definite position on the resistance 101 for every position of the pinion 45 on the rack 48. The slider 112 is positioned on the resistance 100 by means of a knob 118 which also positions a pointer 119 which cooperates with suitable indicia 120. The resistance 100 together with the slider 112, knob 118, pointer 119 and indicia 120 may suitably be located in the pilot's compartment of the airplane. The airplane pilot may then position the pointer 119 at a suitable point on indicia 120 corresponding to the number of degrees of drift of the airplane.

When the slider 112 is located at a position on the resistance 100 so that it is at the same potential as the slider 115 on the resistance 101, no input voltage will be supplied to the terminals 95 and 96 of the amplifier 85. When this condition exists the secondary windings 82 and 83 supply no current to the winding 67 of the motor 44 and the armature 68 is at rest.

If the upper end of the secondary 107 of the transformer 105 be assumed to be at zero potential, then the left-hand ends of resistances 100 and 101 are also at zero potential. If the slider 112 is moved toward the left on the resistance 100, the potential applied to the input terminal 95 of the amplifier 85 will be reduced, and since the slider 115 cooperating with the resistance 101 has not yet moved, the input terminal 96 of the amplifier 85 which is connected to the slider 115 will be at a higher potential than the input terminal 95. Therefore, an alternating potential will be applied to the input terminals of the amplifier 85. A current then flows in the motor winding 67 of such a phase with respect to the current flowing in winding 66 as to turn the armature 68 in a direction to move the slider 115 towards the left. When the slider 115 is moved to the left a sufficient distance to bring the potential at the slider 115 to the same value as the potential at the slider 112, there will no longer be an alternating input signal applied to the amplifier 85 and the armature 68 will come to rest.

Now assume that the slider 112 is moved toward the right on the resistance 100. Before the slider 115 is moved on the resistance 101, a potential difference again exists between the sliders 112 and 115 and therefore between the two input terminals of the amplifier 85. Again assuming that the upper end of the secondary 107 is at zero potential and that the left-hand ends of the resistances 100 and 101 are also at zero potential, then the slider 112 is at a higher potential than the slider 115. An alternating potential is again applied to the input terminals of the amplifier 85 but this signal is 180 degrees different in phase from the signal applied when the slider 112 was at a lower potential than the slider 115. The amplifier 85 then energizes the winding 67 of the motor 44 so that the phase relation between the current flowing in the motor windings 66 and 67 is such as to rotate the armature 68 in the direction to move the slider 115 toward the right. When the slider 115 is moved to the right a distance sufficient to render the potential at the slider 115 the same as at the slider 112, no signal is impressed on the input terminals of the amplifier 85 and the motor 44 no longer is operated.

It will be seen therefore that the motor 44 and therefore the frame member 26 referred to in connection with Figures 1 through 4 and also the camera itself assumes a definite position about the normally vertical axis with respect to the airplane and the frame 10 of the camera levelling device for each position of the pointer 119 which cooperates with the indicia 120.

Figure 6:
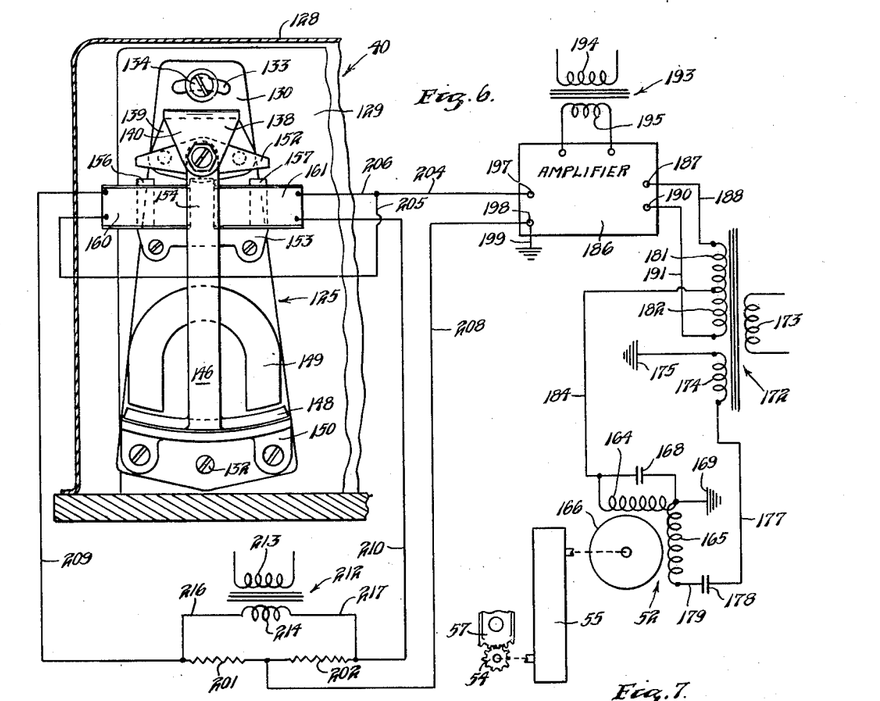
Figure 6 is an elevation of one of the gravity influenced pick-up means employed in the camera levelling device of Figures 1 through 5, together with a schematic diagram of the electric circuit in which it is employed.
Figure 7:
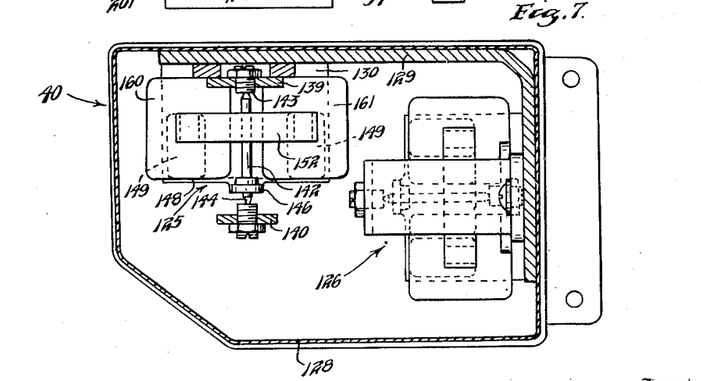
Figure 7 is a plan view, partly in section, of the pick-up means shown in Figure 6.

The controlling pick-up 40 for the motors 52 and 60 is shown in Figures 6 and 7. The pick-up 40 includes a pair of gravity influenced control units 125 and 126 which are identical and which are mounted within a casing 128 which is carried by one of the supports 30 so that its position corresponds to that of the camera or other supported device. The pick-up unit 125 is in control of roll motor 52 while the pick-up unit 126 is in control of the pitch motor 60. Since the pick-up units 125 and 126 are identical, only the unit 125 will be described in detail. An angle member 129 carried within the casing 128 serves as a support for a back plate 130 for the pick-up unit 125. The plate 130 is pivoted at its lower end in the angle member 129 on a screw 132, while the upper end of the plate 130 is provided with a slot 133 through which a screw 134 passes into the angle member 129. The relative position between the plate 130 and the member 129 and therefore between plate 130 and support 30 may be adjusted by loosening the screw 134 and selecting the proper position for the plate 130 before retightening that screw. An inverted U-shaped member 138 has one of its legs 139 secured to the plate 130. The leg 139 of the U-shaped member 138 together with an outer leg 140 support a rod 142 pivoted therebetween. The inner end of the rod 142 is pivoted in the leg 139 at 143 while the outer end of the rod 142 is pivoted in the leg 140 at 144. In order to provide an accurate and substantially frictionless support for the rod 142, the two pivots 143 and 144 are preferably of the jewel type. A pendulum 146 is secured to the rod 142 and therefore pivots with respect to the stationary parts of the device on the pivots 143—144. The lower extremity 148 of the pendulum 146 is arcuate in shape and adapted to cooperate with a permanent magnet 149 which is secured to the plate 130. The arcuate portion 148 of the pendulum 146 also cooperates with soft iron member 150 which is also secured to the plate 130. The gap between the portion 148 of the pendulum and the permanent magnet 149 is very small as is the gap between the portion 148 and the soft iron member 150. The resulting effect of the structure just described is to provide magnetic damping for the pendulum 146. The pendulum 146 and its arcuate portion 148 are of some suitable material of low electrical resistance such as copper.

Also attached to the rod 142 and therefore movable by the pendulum 146 is an armature 152 which is adapted to cooperate with an E-shaped core member 153 which is secured to plate 130. The core member 153 has an upwardly extending center leg 154 and a pair of upwardly extending outer legs 156 and 157. The center 154 extends to a point on close proximity to the central portion of the armature 152. The armature 152 is so shaped that as the pendulum 146 moves with respect to the stationary portions of the device, the air gaps between the armature 152 and the two outer legs 156 and 157 of the core 153 are varied inversely. A winding 160 surrounds the leg 156 of core 153 while a winding 161 surrounds the leg 157. If the pendulum 146 is moved in a clockwise direction as seen in Figure 6, the armature 152 would approach the leg 157 and recede from the leg 156, thereby increasing the impedance of the coil 161 and decreasing the impedance of the coil 160. If the armature 146 is moved in a counter-clockwise direction, the impedance of the coil 160 would increase and that of the coil 161 decrease. Of course, in actual operation the pendulum 146 will hang substantially stationary and it will be the remainder of the mechanism which is tilted.

The details of this variable impedance device, per se, are shown and claimed in the copending application of Willis H. Gille and Harold A. Petsch, Serial No. 453,914, dated August 6, 1942, now matured into Patent No. 2,371,236, issued March 13, 1945.

The operation of the pick-up unit 125 in conjunction with the roll motor 52 of the device as described in Figures 1 to 4 is as follows: The motor 52 includes a pair of windings 164 and 165 which drive an armature 166. The armature 166 drives the pinion 54 through the reduction gearing 55 and cooperates with the gear segment 57 to position the member 18 of Figures 1 to 4 with respect to the gimbal ring 14. The windings 164 and 165 of the motor 52 are spaced ninety electrical degrees apart in accordance with the conventional construction of split phase induction motors. A condenser 168 is connected in parallel with winding 164. The common terminal of the windings 164 and 165 is grounded at 169.

The capacitance of the condenser 168 and the inductance of winding 164 is so proportioned that the two form a series resonant loop circuit. This loop circuit is supplied with energy by transformer action from winding 165, but the current flow in winding 164 caused by this transformer action is not sufficient, or of proper phase relationship, to cause rotation of the armature 166. When a slight additional amount of energy is supplied to winding 164, however, it is energized sufficiently to start rotation of the armature 166 in a direction determined by the phase of such additional energy supplied to the winding 164.

A transformer 172 having a primary winding 173 is provided with a secondary winding 174, one end of which is grounded at 175. The other end of the winding 174 is connected by a wire 177, a condenser 178, and a wire 179 to the end of the motor winding 165 which is not grounded. Since the winding 165 is supplied with current through the condenser 178, the phase of the alternating current in this winding is substantially ninety degrees out of phase with that in the secondary winding 174 of the transformer 172. The motor winding 164 when energized is supplied with alternating current from a secondary winding 181 or secondary winding 182 of the transformer 172. The junction between windings 181 and 182 is connected to the motor winding 164 by means of a wire 184. An amplifier 186 which is similar to that described in connection with Figure 5 and which is preferably of the type disclosed in Figure 1 of Patent No. 2,423,534, has an output terminal 187 which is connected to the secondary winding 181 of the transformer 172 by a wire 188, and an output terminal 190 which is connected to the secondary winding 182 by a wire 191. The amplifier 186 is supplied with power from a transformer 193 having a primary winding 194 and a secondary winding 195. The amplifier 186 is also provided with input terminals 197 and 198, the terminal 198 being grounded at 199. The amplifier 186, in effect, supplies winding 164 with alternating current of a given phase, or the opposite, depending upon the relation between the phase of the alternating signal impressed on the input terminals and the phase of the voltage existing in the secondary windings 181 and 182 of the transformer 172. The direction of rotation of the armature 166 of the motor 52, as previously pointed out, depends upon the phase of the current supplied to the winding 164. Therefore, the direction of rotation of the armature 166 will depend upon the phase of the signal impressed upon the input terminals of the amplifier 186. When no signal is impressed on the input terminals of the amplifier 186, no current is supplied to the motor winding 164 and the armature 166 of the motor 52 remains stationary.

The input terminals 197 and 198 of the amplifier 186 are connected to a bridge circuit including the coils 160 and 161 of the pick-up unit 125. The bridge circuit also includes a pair of equal resistances 201 and 202 which are connected in parallel with the coils 160 and 161. The input terminal 197 of the amplifier 186 is connected to the pick-up coil 160 by means of wires 204 and 205, and is connected to the pick-up coil 161 by means of wires 204 and 206. A wire 208 interconnects the junction between the resistances 201 and 202 and the input terminal 198 of the amplifier 186. The pick-up coil 160 is connected to the resistance 201 by a wire 209, while the pick-up coil 161 is connected to the resistance 202 by a wire 210. A transformer 212 having a primary winding 213 supplies power to the bridge circuit from its secondary 214 which is connected to the resistance 201 by means of a wire 216 and to the resistance 202 by means of a wire 217. The primary 213 of the transformer 212 must be connected to the same source of alternating current as the primary 173 of the transformer 172 in order that there be a definite relationship between the phase existing in the bridge circuit and that in the secondary windings of the transformer 172. Preferably, the secondary winding 214 of the transformer 212 may be a supplementary secondary winding on the transformer 172.

The operation of the control circuit of Figure 6 is as follows: When the armature 152 is positioned by the pendulum 146 so that it is in midposition with respect to the legs 156 and 157 of the E-shaped core member 153, the inductance of the pick-up coils 160 and 161 is the same. As pointed out before, the junction between the coils 160 and 161 is connected to the input terminal 197 of the amplifier 186. The junction between the two equal resistances 201 and 202 is connected to the input terminal 198 of the amplifier 186. An alternating potential is applied across the two resistances 201 and 202, and also across the two coils 160 and 161. Since the inductances of the coils 160 and 161 are equal and since the resistances of the resistances 201 and 202 are equal, the junction between the coils 160 and 161 and the junction between the resistances 201 and 202 are at the same potential. Hence no alternating current signal is applied to the input terminals of the amplifier 186. As heretofore pointed out, when no signal is impressed on the amplifier 186, there can be no energization of motor winding 164 and the armature 166 of the motor 52 remains at rest. This is the condition which exists when pick-up unit 125 is in its proper position with respect to the horizon. The member 18, as illustrated in Figures 1 to 4, is also in its proper relation to gimbal ring 14 and no operation of the motor 52 is required.

In case the pendulum 146 and therefore the armature 152 is rotated in a counter-clockwise direction with respect to the core 153, the inductance of the pick-up coil 160 is increased and that of the coil 161 decreased. With this condition the potential of the junction between the coils 160 and 161 and therefore the potential of the input terminal 197 of the amplifier 186 is no longer at the same value as the junction between the resistances 201 and 202 and therefore of the input terminal 198 of the amplifier 186. Hence, an alternating signal is applied to the input terminals of the amplifier 186 and current flows in motor winding 164 of such a phase as to cause the armature 166 to rotate in a direction to move the gimbal 14 with respect to frame member 18 so as to return the pendulum 146 and the armature 152 to their neutral position with respect to the core 153 which is fixed with respect to the camera support. When this condition is attained, a signal will no longer be impressed on the amplifier and the motor 52 will cease operation.

Likewise, if the pendulum 146 and the armature 152 are rotated in a clockwise direction with respect to the core 153, the inductance of the coil 161 is increased and that of the coil 160 decreased. The potential of the junction between the coils 160 and 161 is no longer equal to the potential at the junction between the resistances 201 and 202 and an alternating signal is impressed on the input terminals 197 and 198 of the amplifier 186. This alternating potential is, however, 180 electrical degrees out of phase with the signal which was impressed on the amplifier when the armature 152 was moved in a counter-clockwise direction. This signal when applied to the amplifier 186 will result in a current flow in the winding 164 of the motor 52 of such a phase relationship with respect to the current flowing in the winding 165, that the armature 166 rotates in such a direction as to position the member 18 with respect to the gimbal ring 14 to re-level the pick-up device 40. Sufficient movement of the pick-up 40 will reposition the core 153 with respect to the armature 152 of the position shown in which the inductance of the two coils 160 and 161 is equal. When this condition exists there is no longer a signal impressed on the input terminals of amplifier 186 and the motor winding 164 is no longer energized and the armature 166 comes to rest. Although the operation of the device has been described as resulting from a movement of armature 152 and pendulum 146 about the pivots 143 and 144, it should be remembered that in the actual operation of the device the pendulum 146 and the armature 152 remain in a substantially fixed vertical position and it is the movement of the pick-up unit 125 and core 156 with respect to the true vertical which causes actuation of the motor.

The pick-up unit 126 which is also mounted within the casing 128 of the pick-up 40 is, as heretofore pointed out, identical to the pick-up unit 125. The pendulum of the pick-up unit 126 is pivoted on an axis at right angles to that of the pick-up unit 125, and it is therefore sensitive to inclinations of the camera levelling device in a direction at right angles to the direction in which the pick-up unit 125 is sensitive. It is not deemed necessary to describe the pick-up unit 126 in detail nor is it necessary to describe the control circuit by means of which the unit 126 controls the pitch motor 60 which is adapted to correct the position of the camera when the airplane in which the device is mounted becomes inclined in a fore and aft direction. The motor circuit and the amplifier and bridge circuits are identical to those described in connection with the pick-up unit 125 and the roll motor 52.

Figure 8:
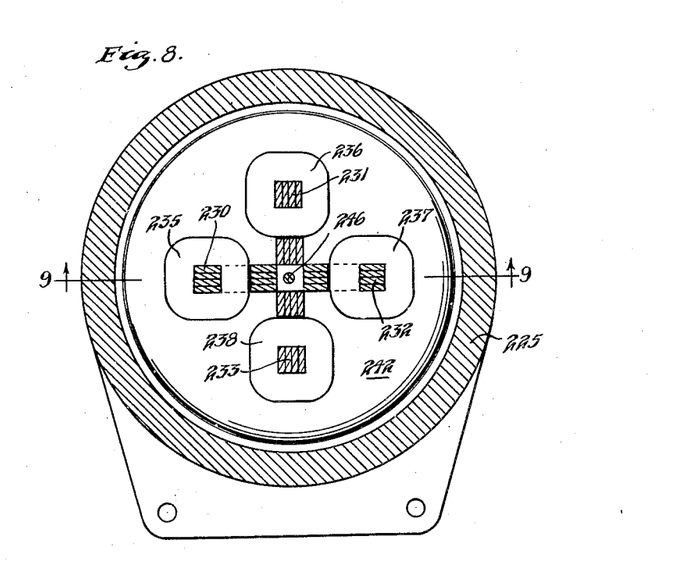
Figure 8 is a plan view of an alternate form of gravity influenced pick-up means.
Figure 9:
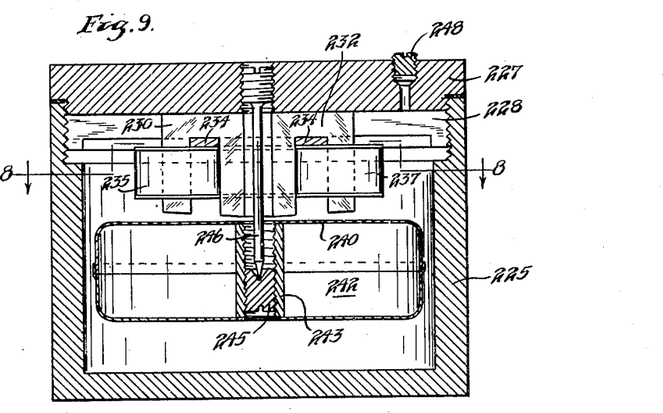
Figure 9 is a sectional elevation taken substantially on line 9—9 of Figure 8.

Referring now to the controlling pick-up shown in Figures 8 and 9, this device may be substituted for the controlling pick-up 40 which is described in detail in connection with Figures 6 and 7. This device includes a cup 225 which is adapted to be secured to one of the camera supports 30. The cup 225 is screwthreaded internally at its upper or open edge to receive a cover 227. The lower surface of the cover 227 is provided with a pair of grooves 228 disposed at right angles to each other. The grooves 228 are adapted to receive four U-shaped laminated iron core members 230, 231, 232 and 233 disposed radially about the center of the cover 227 with each core member having its legs depending therefrom. Any suitable means such as clamps 234 may be provided to secure the core members in fixed position in the grooves 228 in the cover 227. The outer legs of the core members have coils 235, 236, 237 and 238, respectively, mounted thereon.

Opposite pairs of these coils are connected to cooperate in controlling the two levelling motors of the device. For example, the coils 236 and 238 correspond to the coils 160 and 161 of the pick-up 125 described in Figure 6, while the coils 235 and 237 correspond to the two coils of the pick-up unit 126 of the former device. A single iron armature 240 cooperates with all of the U-shaped core members 230, 231, 232 and 233. The armature 240 comprises the upper surface of a float 242. The float 242 is provided with a sleeve 243 extending downwardly through its center.

which sleeve is screw-threaded internally to receive an adjustable bearing member 245 provided with a conical bearing surface at its upper end. A float pivot 246 comprising a pointed rod is provided with screw threads at its upper end which cooperate with corresponding threads in an opening through the cover 227. The float pivot 246 extends downwardly from the center of the cover 227 between the inner legs of the U-shaped core members. The lower end of the float pivot 246 is conical in shape and cooperates with the float bearing 245. The normal spacing between the core members and the armature 240 may be adjusted by turning the float pivot 246 in the cover 227. The entire space within the cup 225 around the float 242, the core members 230, 231, 232 and 233, the coils 235, 236, 237 and 238 is filled with a suitable liquid. A filling plug 248 is provided in the cover 227 for the purpose of filling this space with liquid.

The float pivot 246 pivots the float 242 at a point corresponding to the center of gravity of the float 242. This adjustment may be obtained by turning the bearing 245 in the sleeve 243. The float is so constructed that the center of gravity thereof is appreciably below the center of buoyancy. When the cup 225 is tilted in various directions, the float will tilt to vary the distance between the armature 240 and the various core members to obtain the desired control effect since the float is pivoted at a point below its center of buoyancy. Lateral accelerations of the device will, however, have substantially no effect on the position of the float 242 since it is pivoted at its center of gravity. Hence, acceleration of the airplane in which the device is mounted will have no appreciable effect upon the control of the level of the camera.

From the foregoing, it will be apparent that I have provided a camera levelling device which is suitable for use in aerial photography and which is very sensitive and accurate in operation. Many modifications which embody the essential features of my invention will occur to those skilled in the art, and I therefore intend my invention to be limited only by the appended claims.

I claim as my invention:

1. In a levelling device, in combination, a support subject to inclinations from a normal position, a first member pivoted in said support on a normally horizontal first axis, a second member pivoted in said first member on a normally horizontal second axis at right angles to said first axis, a third member so carried by said second member as to pivot with respect thereto about a normally vertical axis, first reversible motor means carried by said second member at a point remote from said vertical axis and adapted to cause rotation of said second member about said second axis, and second reversible motor means carried by said third member at a point remote from said vertical axis and normally diametrically opposed to said first motor means and adapted to cause rotation of said third member about said vertical axis.

2. In an aerial camera levelling device, in combination, a support subject to inclinations from a normal position, a first member pivoted in said support on a normally horizontal first axis, a second member pivoted in said first member on a normally horizontally second axis at right angles to said first axis, a camera carrying member so carried by said second member as to pivot with respect thereto about a normally vertical axis, first reversible motor means adapted to rotate said first member on said first axis, second reversible motor means adapted to rotate said second member on said second axis, third reversible motor means adapted to rotate said camera carrying member about said vertical axis in both directions from a normal position, control means for each of said first and second motor means mounted on said camera carrying member, each of said control means being responsive to tilting and including a pair of electrical coils, magnetic circuit means for said coils including a core member and an armature having oppositely extending portions, each said portions forming a part of the magnetic circuit for one of said coils, whereby on movement of said armature the impedances of said coils are oppositely varied, a liquid filled container, and a float in said container associated with said armature for varying the position of said armature with respect to said core member when the control means is tilted.

3. In a device of the class described, in combination: a support subject to inclination from a level attitude; a member to be maintained in a level attitude; motor means for adjusting the attitude of said member with respect to said support; a rigid float pivotally responsive to departure of said member from said level attitude; variable inductance means adjusted in accordance with the response of said float; and means connecting said motor means in controlled relation to said impedance means, whereby to cause correction in the attitude of said member whenever it deviates from the level.

4. In a device of the class described, in combination: a support subject to inclination from a level attitude; a member to be maintained in a level attitude; motor means for adjusting the attitude of said member with respect to said support; a hollow float tiltable with respect to said member upon departure thereof from said level attitude; fluid means buoyantly supporting said float in a totally submerged condition; variable impedance means adjusted in accordance with the tilt of said float; and means connecting said motor means in controlled relation to said impedance means, whereby to cause correction in the attitude of said member whenever it deviates from the level.

5. In a device of the class described, in combination: a support subject to inclination from a level attitude; a member to be maintained in the level attitude; motor means for adjusting the attitude of said member with respect to said support; a float having its center of gravity lower than its center of buoyancy, and having a pivot located at its center of gravity; means mounted on said member and buoyantly supporting said float against said pivot, whereby to render said float responsive to tilt of said member; means varied in impedance in accordance with said response of said float; and means connecting said motor means in controlled relation to said impedance means, whereby to cause correction in the attitude of said member whenever it deviates from the level.

6. In a device of the class described, in combination: a support subject to inclination from a level attitude in any direction; a member to be maintained in a level attitude; motor means for adjusting the position of said member with respect to said support about each of a pair of normally horizontal axes; control means for said motor means comprising a float of magnetic material, a fluid-containing housing pivotally mounting said float for relative tilting therebetween, impedance devices each comprising a magnetic core with a winding formed thereon; means supporting pairs of said cores in alignment with said axes, so that said float cooperates with said cores to oppositely vary the impedances of the coils of said pairs; and means energizing said motors, in accordance with the impedances of the coils of said pairs, to adjust the position of said member so that it assumes a level attitude.

7. In a levelling device, in combination, a support subject to inclinations, a gimbal having a normal position and pivotally mounted on said support for movement about a predetermined axis, motor means for causing relative movement about said gimbal and said support, control means for said motor means comprising a rigid body, an inverted pivot carried by said gimbal, means buoyantly supporting said body against said pivot, with its center of buoyancy higher than its pivot point, for pivotal movement about at least an axis aligned with said predetermined axis, and means including variable impedance means responsive to pivotal movements of said body and acting as a result of inclination of said support to cause operation of said motor to restore said gimbal to its normal position.

PAUL F. SHIVERS.

REFERENCES CITED

The following references are of record in the file of this patent:

UNITED STATES PATENTS

| Number | Name | Date |
|---|---|---|
| 1,585,484 | Gasser | May 18, 1926 |
| 1,586,233 | Anschutz-Kaempfe | May 25, 1926 |
| 1,840,104 | Anschutz-Kaempfe | Jan. 5, 1932 |
| 1,942,604 | Kennedy | Jan. 9, 1934 |
| 2,013,106 | Nagel et al. | Sept. 3, 1935 |
| 2,014,825 | Watson | Sept. 17, 1935 |
| 2,371,236 | Gille et al. | Mar. 13, 1945 |
| 2,446,096 | Moore | July 27, 1948 |
| 2,446,325 | Gille | Aug. 3, 1948 |

FOREIGN PATENTS

| Number | Country | Date |
|---|---|---|
| 439,227 | Germany | Jan. 12, 1927 |
| 516,185 | Great Britain | Dec. 27, 1939 |